(12) United States Patent
Moorman et al.

(10) Patent No.: US 9,383,007 B2
(45) Date of Patent: Jul. 5, 2016

(54) TRANSMISSION WITH ELECTRONIC RANGE SELECTOR AND PRE-EMPTIVE POWER LOSS CONTROL LOGIC

(71) Applicant: GM GLOBAL TECHNOLOGY OPERATIONS LLC, Detroit, MI (US)

(72) Inventors: Steven P. Moorman, Dexter, MI (US); Todd R. Berger, Pinckney, MI (US); Orson S. Wang, Novi, MI (US); Dong Da, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 149 days.

(21) Appl. No.: 14/462,807

(22) Filed: Aug. 19, 2014

(65) Prior Publication Data

US 2016/0053887 A1   Feb. 25, 2016

(51) Int. Cl.
*F16H 61/16* (2006.01)
*F16H 61/12* (2010.01)
*F16H 59/44* (2006.01)

(52) U.S. Cl.
CPC ............... *F16H 61/16* (2013.01); *F16H 59/44* (2013.01); *F16H 61/12* (2013.01); *F16H 2061/1232* (2013.01); *F16H 2061/1292* (2013.01); *F16H 2061/168* (2013.01)

(58) Field of Classification Search
CPC . F16H 61/12; F16H 61/16; F16H 2061/1232; F16H 2061/1292; F16H 2061/168; F16H 59/44
See application file for complete search history.

(56) References Cited

U.S. PATENT DOCUMENTS

| 6,307,376 B1 * | 10/2001 | Alexander | F16H 61/12 |
| | | | 324/388 |
| 2002/0115527 A1 * | 8/2002 | Miyata | F16H 59/08 |
| | | | 477/34 |

* cited by examiner

*Primary Examiner* — Jacob S Scott
(74) *Attorney, Agent, or Firm* — Quinn Law Group, PLLC

(57) ABSTRACT

A vehicle includes an engine, a transmission with a shift valve, an alternator, an auxiliary battery, a voltage sensor operable to measure an auxiliary voltage, and an electronic transmission range selection (ETRS) system. The ETRS system includes a controller, and also an electronic range selector device that transmits an electronic range request signal to the controller to request the shift of the transmission to a requested operating range. The controller executes a method to predict a loss of auxiliary power aboard the vehicle, and to control an action of the vehicle in response to the predicted loss of auxiliary power. The electronic range request signal is received from the range selector device and auxiliary voltage. The controller calculates a slope of a decrease in the measured auxiliary voltage. A control action is executed with the alternator is in the charging state and the calculated slope exceeds a calibrated slope threshold.

20 Claims, 2 Drawing Sheets

TRANSMISSION WITH ELECTRONIC RANGE SELECTOR AND PRE-EMPTIVE POWER LOSS CONTROL LOGIC

TECHNICAL FIELD

The present disclosure relates to a transmission having an electronic range selector and pre-emptive power loss control logic.

BACKGROUND

A conventional automatic vehicle transmission includes a shift lever positioned in a vehicle interior in easy reach of a driver of the vehicle. Movement of the shift lever enables the driver to manually select a desired transmission operating range, usually from park, reverse, neutral, drive, and first gear/low. This lever, which is referred to as a PRNDL lever in the art, is mechanically coupled to a shift valve of the transmission by a length of cable. Tension on the cable during actuation of the shift lever moves the shift valve to thereby enable the selected operating range.

An electronic transmission range select (ETRS) system may be used as an alternative to a mechanically-actuated PRNDL lever. An ETRS system dispenses with the cable in favor of transmitting electronic signals, either to the shift valve or to flow/pressure control solenoids depending on the design. ETRS systems thus enable by-wire range selection, which can help to reduce weight while providing other performance advantages.

SUMMARY

A vehicle is disclosed herein having an automatic transmission with a shift valve and an electronic transmission range selection (ETRS) system. The ETRS system includes a range selector device and a controller. The range selector device includes plurality of push-buttons each in electronic communication with the controller, such as separate park (P), reverse (R), neutral (N), drive (D), and first gear/low (L) push-buttons. Depression of one of the push-buttons transmits an electronic range request signal to the controller to request a shift of the transmission, via the shift valve, to a corresponding operating range. The controller receives the transmitted range request signal and commands an actuation of the shift valve to a corresponding position needed for achieving the requested operating range.

As is well known in the art, transmission park systems typically engage a park gear using a park pawl. The park gear is connected to a transmission output member. Thus, whenever a driver shifts the transmission into park, teeth or splines of the park pawl engage mating teeth or splines of the park gear to prevent rotation of the output member. Park pawls are typically designed to ratchet from a threshold low vehicle speed and engage at or near zero speed to prevent damage to the park pawl. That is, if a driver were to select the park range via a PRNDL lever from a slow rolling speed, the park pawl would not immediately engage the park gear, but would instead ratchet down to a zero or low non-zero engagement speed.

A possible control problem is presented in vehicles using ETRS systems. As by-wire devices, the components of the ETRS system require a continuous supply of auxiliary power. If an alternator of the vehicle were to fail to deliver a charge to an auxiliary battery when requested, for instance if a serpentine belt connecting the alternator to an engine pulley were to loosen or break, the transmission may immediately default to a park state. An immediate shift to park, above the speed threshold that is appropriate for ratcheting of the park pawl, could in turn damage the park pawl. A default shift to neutral instead of park largely protects the park system, but has the disadvantage of immediately disabling drive functionality.

It is therefore recognized herein that there is a need for an improved default control strategy for auxiliary power loss in a vehicle having an ETRS system. The approach set forth herein protects the park system while optimizing overall drive functionality. To this end, the controller is programmed to monitor auxiliary voltage aboard the vehicle after a charging request is made to the alternator, and to predict a future power loss from the trajectory of the monitored auxiliary voltage. The controller executes a control action that is preemptive in nature when a future power loss is predicted, i.e., when, in spite of an active charge request, the alternator fails to provide a sufficient output voltage to the battery.

In particular, an example vehicle is disclosed herein that includes an engine, a transmission having a shift valve operable to shift the transmission to a requested operating range, an alternator, an auxiliary battery, a voltage sensor, and an ETRS system. The voltage sensor, which is positioned between the alternator and the auxiliary battery, is operable to measure an auxiliary voltage. The ETRS system includes a controller and an electronic range selector device. The electronic range selector device transmits an electronic range request signal to the controller to request the shift of the transmission to the requested operating range.

The controller in this embodiment is programmed to predict a loss of auxiliary power aboard the vehicle, as well as to control an action of the vehicle in response to the predicted loss of auxiliary power. The controller does this by receiving the electronic range request signal from the electronic range selector device and the measured auxiliary voltage, and then determining if the alternator is in a charging state and if the measured auxiliary voltage is less than a calibrated voltage threshold. The controller also calculates a slope of a decrease in the measured auxiliary voltage, and then executes a control action with respect to the vehicle when the alternator is in the charging state and the calculated slope exceeds a calibrated slope threshold.

The vehicle includes an indicator device in the form of a display screen and/or an audio speaker. The control action may include transmitting an indicator signal to the indicator device to display a message and/or broadcast a verbal message alerting the driver to the predicted loss of auxiliary power. The indicator signal may include a request to display, via the indicator device, an amount of time remaining until auxiliary power to the controller drops below a critical voltage threshold.

The controller may be programmed to request a shift of the transmission to a default range such as park or neutral when the time remaining drops below a time threshold. The default range is neutral in one embodiment when a speed of the vehicle is above a speed threshold, and the default range is park when the speed of the vehicle is below the speed threshold.

A system for use in a vehicle having a transmission includes the voltage sensor, an electronic range selector device having a plurality of push-buttons, and a controller. The electronic range selector device transmits an electronic range request signal in response to a depression of one of the plurality of push-buttons to thereby request an operating range of the transmission. The controller is in communication with the electronic range selector device and the voltage sensor, with the controller being programmed as set forth above.

An example method is also disclosed for predicting a loss of auxiliary power aboard a vehicle and controlling the vehicle in response to the predicted loss of auxiliary power. An example of such a method includes receiving, via a controller, an electronic range request signal from an electronic range selector device, and measuring an auxiliary voltage of the vehicle via a voltage sensor. The method in this example further includes determining, via the controller, if an alternator of the vehicle is in a charging state and the measured auxiliary voltage is less than a calibrated voltage threshold, calculating a slope of a decrease in the measured auxiliary voltage, and then executing a control action with respect to the vehicle when the alternator is in the charging state and the calculated slope exceeds a calibrated slope threshold.

The above features and advantages and other features and advantages of the present invention are readily apparent from the following detailed description of the best modes for carrying out the invention when taken in connection with the accompanying drawings.

DETAILED DESCRIPTION

Figure 1:
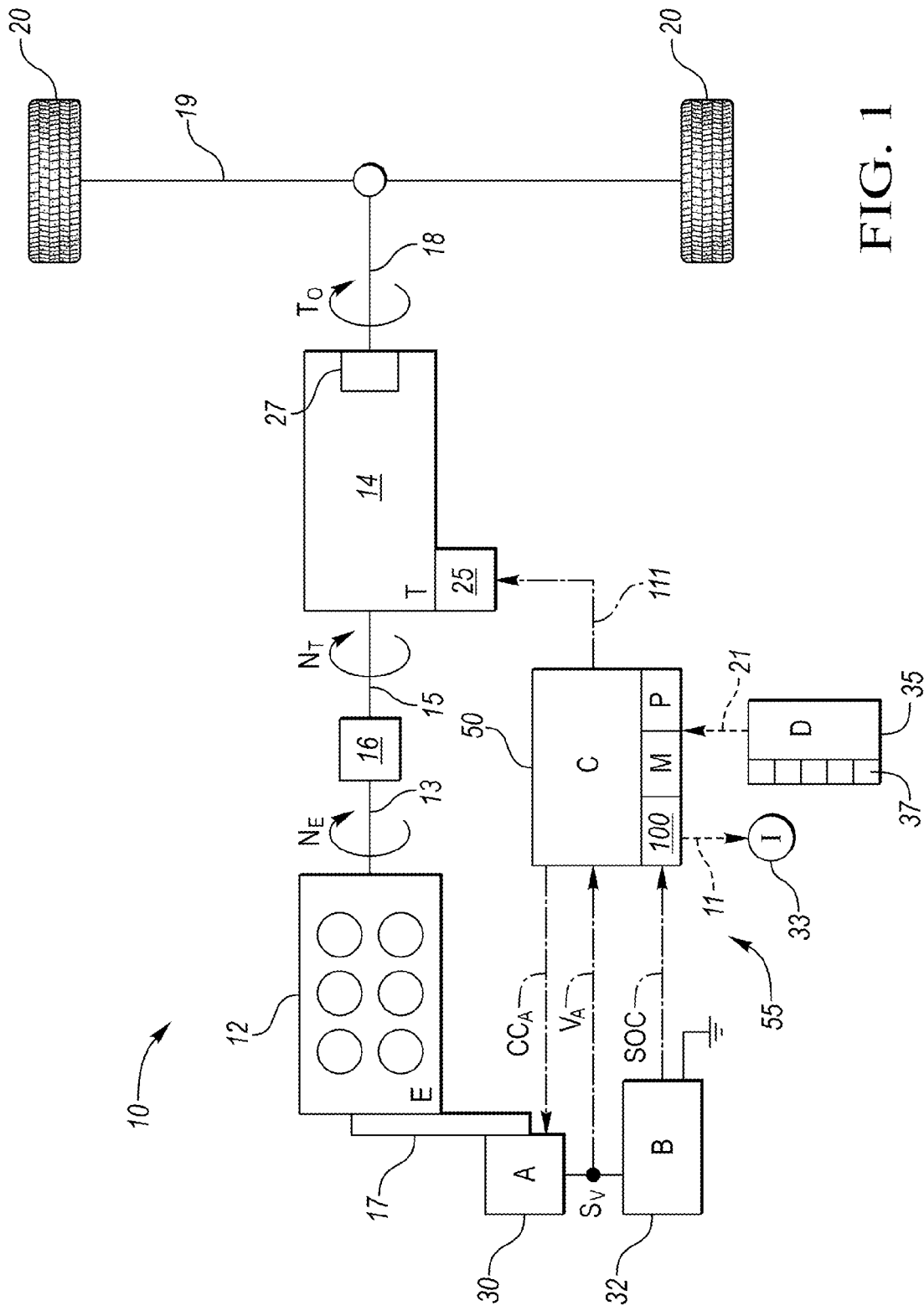
FIG. 1 is a schematic illustration of a vehicle having an electronic transmission range selection system controlled during a predicted auxiliary power loss as set forth herein.

Referring to the drawings, an example vehicle 10 is shown schematically in FIG. 1 having an internal combustion engine 12 and an automatic transmission 14. The engine 12 and transmission 14 are also labeled as E and T, respectively, for illustrative clarity. The vehicle 10 is equipped with an electronic transmission range selection (ETRS) system 55 that is operable for commanding a range shift of the transmission 14, electronically/by-wire, into a desired operating range. Such a range typically includes park, reverse, neutral, drive, and $1^{st}$ gear/low, i.e., the conventional PRNDL range.

The ETRS system 55 includes a voltage sensor Sv, an electronic range selector device (D) 35, and a controller (C) 50. The controller 50 is configured, i.e., equipped in hardware and programmed in software, to execute instructions embodying a method 100, an example of which is provided in FIG. 3 and described below with reference to FIG. 2. Execution of the method 100 ultimately controls a default state of the transmission 14 and takes other driver notification steps during a predicted loss of auxiliary power aboard the vehicle 10, particularly to the controller 50 and a shift valve 25 of the transmission 14. The method 100 helps to ensure that a park pawl 27 of the transmission 14 is protected during the auxiliary power loss while also ensuring that a driver of the vehicle 10 is alerted ahead of time, if possible, that the auxiliary power loss is imminent. The latter control action enables the driver to take necessary actions for leaving the roadway, stopping the vehicle 10, and shifting the transmission 14 into park prior to the loss of auxiliary power.

The electronic range selector device 35 may include a plurality of push-buttons 37. Each push-button 37 corresponds to a desired operating range of the transmission, e.g., separate push-buttons 37 for park (P), reverse (R), neutral (N), drive (D), and $1^{st}$ gear/low (L). The term "push-button" applies herein to any suitable by-wire actuated input, whether embodied as spring-biased buttons, as icons displayed on a touch-sensitive electronic display, or otherwise.

Key to the present approach is that the electronic range selector device 35 is not mechanically connected to the shift valve 25. Instead, a depression of one of the push-buttons 37 causes a transmission of a range selection signal (arrow 21) to the controller 50, which receives the transmitted range selection signal (arrow 21) and commands a shift of the transmission 14 to the corresponding operating range. The operating range is commanded via transmission of shift control signals (arrow 111) to the shift valve 25, or to multiple solenoids or other flow or pressure control valves located in the transmission 14 depending on the embodiment.

With further reference to the structure of the example vehicle 10 as shown in FIG. 1, the engine 12 includes an output shaft 13 that rotates at engine speed (arrow $N_E$). A hydrodynamic torque converter 16 is connected to the output shaft 13, as well as to an input member 15 of the transmission 14. As is known in the art, a torque converter provides desired multiplication of torque from the engine 12 into the transmission 14 at low speeds. Other embodiments of the vehicle 10 may use a clutch or clutch and damper assembly in lieu of the torque converter 16 without departing from the intended inventive scope. Likewise, the powertrain of the vehicle 10 may include one or more electric traction motors in an optional hybrid embodiment to provide additional sources of input torque.

The transmission 14 also includes an output member 18 that delivers output torque (arrow $T_O$) to one or more drive axles 19, and ultimately to a set of drive wheels 20. As noted above, the park pawl 27 is connected to the output member 18 when the transmission is in a park range to prevent rotation of the output member 18. Although the park pawl 27 is shown schematically for illustrative simplicity, those of ordinary skill in the art will recognize that such a device has teeth or splines that mate with teeth or splines of a parking gear (not shown) of the transmission 14. Engagement of the park pawl 27 above a low speed, e.g., 5 MPH, may damage the teeth or splines of the park pawl 27. Therefore, the controller 50 in executing the method 100 seeks to avoid immediate engagement of the park pawl 27 when auxiliary power is lost aboard the vehicle 10.

The vehicle 10 of FIG. 1 also includes an alternator (A) 30 and an auxiliary battery (B) 32. Typical auxiliary voltage levels range from 15-12 VDC, although the method 100 is not limited to such a range. The alternator 30 is mechanically connected to and driven by the engine 12 via a belt 17, e.g., a serpentine belt, and is electrically connected to the auxiliary battery 32. Although omitted from FIG. 1 for illustrative clarity, those of ordinary skill in the art will appreciate that a voltage inverter and regulator would be used at the output of the alternator 30 to convert the AC voltage output of the alternator 30 to a DC voltage at a level sufficient for charging the cells of the auxiliary battery 32.

The voltage sensor ($S_V$) measures the auxiliary voltage (arrow $V_A$) in a continuous control loop and transmits the measured auxiliary voltage to the controller 50, either wirelessly or via a low-voltage communications bus. Likewise, a state of charge (SOC) of the battery 32 may be measured at the battery 32 via any suitable approach, or a requested charging state (arrow $CC_A$) of the alternator 30 may be determined by the controller 50, or via another controller (not shown) and then transmitted to the controller 50. The auxiliary voltage (arrow $V_A$) and the requested charging state (arrow $CC_A$) of the alternator 30, however determined, are ultimately used by the controller 50 in the execution of the method 100, as explained in further detail below with reference to FIGS. 2 and 3.

The controller 50 may be embodied as a computer device, or multiple such devices, each having one or more processors (P) and memory (M). Memory (M) includes sufficient amounts of tangible, non-transitory memory, e.g., optical or magnetic read only memory (ROM), erasable electrically-programmable read only memory (EEPROM), flash memory, and the like, as well as transient memory such as random access memory (RAM). Although omitted for clarity, the controller 50 also includes a high-speed clock, analog-to-digital (A/D) circuitry, digital-to-analog (D/A) circuitry, any required input/output (I/O) circuitry and devices, and signal conditioning/buffering/filtering electronics.

Figure 3:
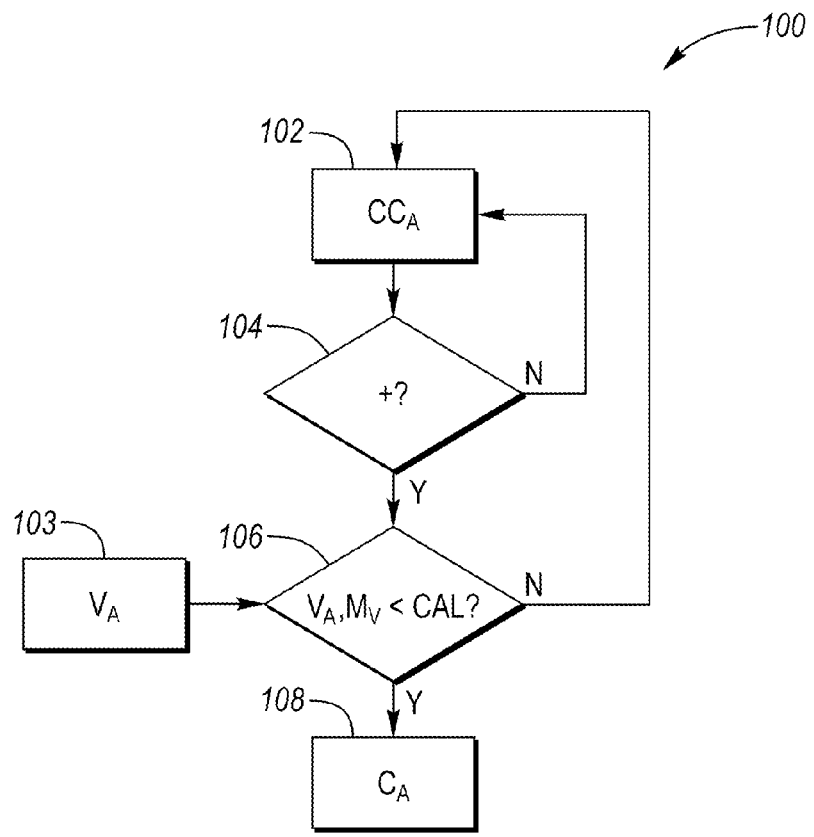
FIG. 3 is a flowchart showing an example method of controlling the ETRS system during a predicted auxiliary power loss.

Individual control algorithms resident in the controller 50 or readily accessible thereby, such as instructions embodying the method 100 of FIG. 3, may be stored in memory (M) and automatically executed via the processor (P) to provide the respective control functionality. Two possible control actions resulting from execution of the method 100 are an indication of an imminent loss of auxiliary power to the driver, e.g., via activation of an indicator device (I) 33 via indicator signals (arrow 11) and a commanded shift of the transmission 14 to a default state such as neutral via the shift control signals (arrow 111). The indicator device 33 may include any one or more of a display screen, audio speaker, and indicator lamp depending on the embodiment, with the possible use of all of these variations described below with reference to step 108 of FIG. 3.

Figure 2:
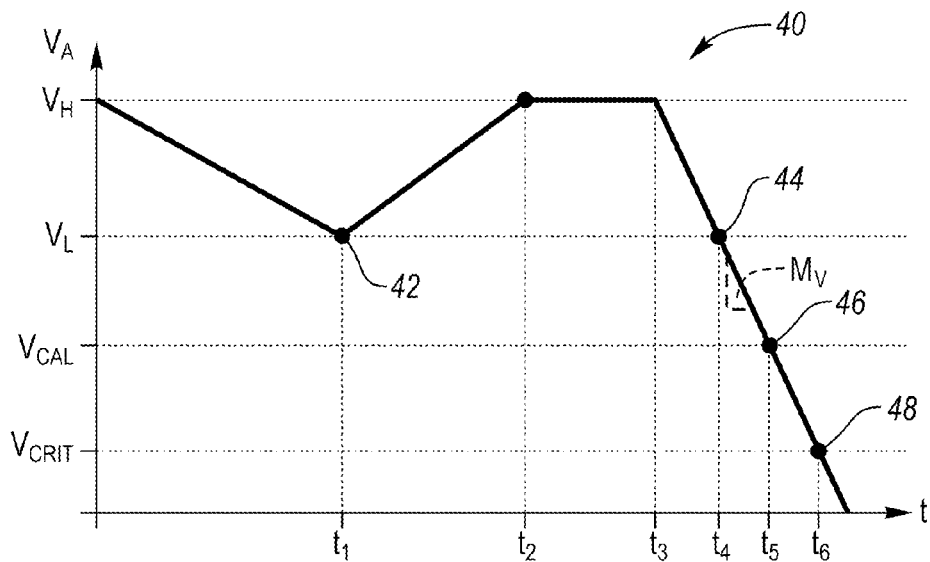
FIG. 2 is a time plot of electrical parameters of the vehicle shown in FIG. 1, with time plotted on the horizontal axis and auxiliary voltage plotted on the vertical axis.

Referring to FIG. 2, a time plot 40 shows changing auxiliary voltage as measured by the voltage sensor ($S_V$) of FIG. 1. Time (t) is depicted on the horizontal axis. The measured DC auxiliary voltage ($V_A$) is plotted on the vertical axis. The time plot 40 illustrates two possible electrical conditions: (1) a properly functioning charging system, which occurs between $t_0$ to $t_3$, and (2) an impending auxiliary power loss starting at about $t_3$ and continuing until $t_6$. In a properly functioning charging system, the auxiliary voltage ($V_A$) starts at a fully-charged high voltage threshold ($V_H$), such as 15 VDC in an example 15 VDC auxiliary system, and gradually decreases as the auxiliary battery 32 discharges power to various auxiliary systems aboard the vehicle 10, e.g., heating or cooling blowers, entertainment devices, pump motors, and the like. At a lower charging voltage threshold ($V_L$), e.g., 12 VDC using the same 15 VDC example, i.e., at point 42 in FIG. 2, the alternator 30 is commanded on via the requested charging state (arrow $CC_A$), either by the controller 50, a battery control module (not shown), or another controller. The auxiliary voltage ($V_A$) should increase steadily and reach the fully-charged high voltage threshold ($V_H$), which occurs at $t_2$ in FIG. 2.

The fully-charged high voltage threshold ($V_H$) is held in FIG. 2 until $t_3$, when the auxiliary voltage again begins to drop as a load is placed on the auxiliary battery 32. As occurred previously at point 42, the lower charging voltage threshold ($V_L$) is again reached at point 44, i.e., at $t_4$. However, unlike the rise in the auxiliary voltage ($V_A$) that occurred previously at $t_1$, after $t_3$ the auxiliary voltage ($V_A$) continues to drop. When this happens, the controller 50 calculates the rate of the voltage drop, i.e., as a slope ($M_V$). A calibrated fault-pending voltage ($V_{CAL}$) is eventually crossed at point 46 at $t_5$. At this point, the controller 50 is aware that the drop in auxiliary voltage ($V_A$) is not a transient event, and therefore takes the necessary preemptive control actions to warn the driver and protect the park pawl 27, for instance those actions described below with reference to step 108 of FIG. 3.

Based on the calculated slope ($M_V$) in the voltage drop, the controller 50 predicts the point in time at which the remaining auxiliary voltage ($V_A$) will become insufficient to power the controller 50, the shift valve 25, and any park-related components of the ETRS system 55 of FIG. 1. This calibrated critical voltage ($V_{CRIT}$) is indicated by point 48. In the example 12-15 VDC auxiliary range used above, for instance, the calibrated critical voltage ($V_{CRIT}$) may be reached at about 9 VDC, with 10 VDC corresponding to the fault-pending voltage ($V_{CAL}$).

The actual critical voltage ($V_{CRIT}$) will vary with the particular voltage ratings of the controller 50, the shift valve 25, and any solenoids used to control flow to the transmission 14, and therefore 9 VDC is just one possible illustrative example. Some flow or pressure control solenoids, for instance, may still continue to operate to some extent at voltages as low as 5-6 VDC. Lower critical voltages and/or flatter slopes ($M_V$) will provide more time to issue warnings to the driver and shift the transmission 14 to a default range, and so the method 100 may be tuned to fit these parameters, e.g., with different control actions being triggered based on the slope ($M_V$) relative to the critical voltage ($V_{CRIT}$), with no actions being taken if the slope ($M_V$) is sufficiently low or flat so as to not pose a realistic threat of a complete loss of auxiliary power occurring in the foreseeable future.

FIG. 3 illustrates an example embodiment of the method 100. At step 102, the controller 50 of FIG. 1 monitors a charging request to the alternator 30 to determine the requested charging state (arrow $CC_A$), and then proceeds to step 104. The controller 50 may make such a request, or the request may originate elsewhere, such as in a battery control module, with the controller 50 simply verifying the requested charging state (arrow $CC_A$). Step 102 may entail receiving and processing the state of charge (arrow SOC) and comparing this to a threshold SOC, with the threshold SOC triggering the requested charging state (arrow $CC_A$) of the alternator 30, i.e., commanding active charging of the auxiliary battery 32 via the alternator 30, or the controller 50 may simply receive an on/off charging state from another controller.

Step 103 includes monitoring the auxiliary voltage ($V_A$). As explained above with reference to FIG. 1, the auxiliary voltage ($V_A$) may be measured via the voltage sensor ($S_V$) at an electrical output of the alternator 30. It is not essential to the method 100 to know what the charge level of the auxiliary battery 32 actually is. Rather, the controller 50 is monitoring the electrical output of the alternator 30. The controller 50 receives the measured auxiliary voltage ($V_A$) and then proceeds to step 106.

At step 104, the controller 50 of FIG. 1 next determines if the alternator 30 has been commanded on, such that the alternator 30 is in a state that should correspond to an increasing auxiliary voltage, i.e., the period between $t_1$ and $t_2$ in FIG. 2. The method 100 proceeds to step 106 if the alternator 30 has been commanded on, which can be determined via knowledge of the requested charging state (arrow $CC_A$). Steps 102 and 104 are otherwise repeated until the alternator 30 is commanded on.

Step 106 entails comparing the auxiliary voltage ($V_A$) to calibrated thresholds to determine whether the auxiliary voltage ($V_A$) is below a voltage threshold, i.e., the calibrated charging voltage ($V_L$) of FIG. 2, and is declining faster than a calibrated rate. The auxiliary voltage ($V_A$) may be compared to the calibrated fault-pending voltage ($V_{CAL}$) at point 46 of FIG. 2, and the slope ($M_V$) may be calculated continuously beginning after the auxiliary voltage drops below the lower charging threshold ($V_L$) at point 44. Step 102 is repeated if the auxiliary voltage ($V_A$) exceeds the calibrated fault-pending voltage ($V_{CAL}$) and/or the calculated slope ($M_V$) is less than a calibrated threshold slope, i.e., the decay in auxiliary voltage ($V_A$) is occurring with a sufficiently flat trajectory that does not necessitate execution of a control action.

That is, if a driver of the vehicle 10 were to turn on all auxiliary systems in the vehicle 10, and if the auxiliary power system of the vehicle 10 is improperly sized or perhaps running at less than its original efficiency due to component degradation, age, or other reasons, this could present a prolonged drain on the auxiliary battery 32. The alternator 30 may not be able to keep up with the demand of such a load. The auxiliary battery 32 would slowly become depleted, but at a rate that is so slow that it does not pose a threat of imminent power loss to the controller 50 and other components. Such conditions would not trigger execution of the control actions envisioned herein. However, when a threshold drop in auxiliary voltage ($V_A$) and/or the slope ($M_V$) is higher than the calibrated slope threshold, the method 100 proceeds to step 108.

Step 108 includes executing a control action via the controller 50 to address the predicted imminent loss of auxiliary power aboard the vehicle 10. The particular control action taken by the controller 50 depends on the level of auxiliary voltage ($V_A$) or the calculated slope ($M_V$), i.e., on how soon the power loss is expected to occur. If power loss is imminent, the controller 50 may alert the driver via the indicator signals (arrow 11) to the indicator device 33 of FIG. 1, e.g., via display of a message on a display screen and/or broadcast of a verbal warning via an audio speaker into the interior of the vehicle 10, followed by a shift of the transmission 14 to a neutral or park range depending on the speed of the vehicle 10. If the loss of power is not predicted to occur immediately, for instance a minute or more of auxiliary power remains, instructions may be displayed or broadcast to the driver informing the driver to pull over and place the transmission 14 in park.

Optionally, the controller 50 may be programmed to calculate, using the measured auxiliary voltage ($V_A$) and the calculated slope ($M_V$), an amount of time remaining until auxiliary power to the controller 50 drops below a critical voltage threshold. The controller 50 may also be programmed to request a shift of the transmission 14 to a default range when the time remaining drops below a threshold, e.g., below 30 seconds. Thus, any warnings presented to the driver may be accompanied by periodic updates on the predicted amount of time remaining until the power loss occurs. Vehicles equipped with navigation systems may be configured such that the existing voice navigation systems communicate with the controller 50 to broadcast such information verbally, perhaps giving specific driving instructions as to where to pull over or turn, thereby allowing the driver to focus on the roadway and execute the required maneuver.

If no action is taken by the driver within a calibrated window of time of point 48 of FIG. 2, the controller 50 can shift the transmission 14 to the required default range, e.g., neutral or park, with park being selected only below a calibrated ratcheting speed of the park pawl 27. As each park pawl 27 is configured differently, the ratcheting speed could vary with the strength of the design of the park pawl. Typically, however, the calibrated ratcheting speed is less than 3-5 MPH.

Using the method 100, conditions indicative of an impending park system default engagement are monitored, and pre-emptive control actions are taken to protect the park pawl 27 and optimize the driving experience. By communicating with the driver ahead of a power loss, rather than defaulting to a neutral or park range only after power has been lost, the driver retains the ability to perform driving maneuvers sufficient for exiting the roadway or driving to a repair station in the event of an imminent power loss. In the event insufficient time remains for such maneuvers, the controller 50 is still able to lower vehicle speed, e.g., via a shift to neutral, thus limiting any impact to the park pawl 27 and other park system components.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine;
a transmission connected to the engine and having a shift valve that is operable to shift the transmission to a requested operating range;
an alternator that is driven by the engine;
an auxiliary battery that is electrically connected to the alternator;
a voltage sensor positioned between the alternator and the auxiliary battery, wherein the voltage sensor is operable to measure an auxiliary voltage; and
an electronic transmission range selection (ETRS) system having a controller and an electronic range selector device, wherein the electronic range selector device is operable to transmit an electronic range request signal to the controller to request the shift of the transmission to the requested operating range;
wherein the controller is programmed to predict a loss of auxiliary power aboard the vehicle, and to control an action of the vehicle in response to the predicted loss of auxiliary power by:
receiving the electronic range request signal from the electronic range selector device and the measured auxiliary voltage;
determining if the alternator is in a charging state and the measured auxiliary voltage is less than a calibrated voltage threshold;
calculating a slope of a decrease in the measured auxiliary voltage; and
executing a control action with respect to the vehicle when the alternator is in the charging state and the calculated slope exceeds a calibrated slope threshold.

2. The vehicle of claim 1, wherein the electronic range selector device includes a plurality of push-buttons each corresponding to a respective one of a park range, a reverse range, a neutral range, a drive range, and a $1^{st}$ gear/low range.

3. The vehicle of claim 1, wherein the controller is programmed to receive a state of charge of the battery, and to command the charging state by comparing the received state of charge to a calibrated charging threshold.

4. The vehicle of claim 1, wherein the vehicle includes an indicator device, and the control action includes transmitting an indicator signal to the indicator device.

5. The vehicle of claim 4, wherein the indicator device includes an audio speaker, and the control action includes broadcasting a verbal message via the audio speaker.

6. The vehicle of claim 4, wherein the indicator signal includes a request to display, via the indicator device, an amount of time remaining until auxiliary power to the controller drops below a critical voltage threshold.

7. The vehicle of claim 1, wherein the controller is programmed to calculate, using the measured auxiliary voltage and the calculated slope, an amount of time remaining until auxiliary power to the controller drops below a critical voltage threshold, and to request a shift of the transmission to a default range when the time remaining drops below a time threshold.

8. The vehicle of claim 7, wherein the default range is neutral when a speed of the vehicle is above a speed threshold and park when the speed of the vehicle is below the speed threshold.

9. A system for use in a vehicle having a transmission, the system comprising:
   a voltage sensor;
   an electronic range selector device having a plurality of push-buttons, wherein the electronic range selector device transmits an electronic range request signal in response to a depression of one of the plurality of push-buttons to thereby request an operating range of the transmission; and
   a controller in communication with the electronic range selector device and the voltage sensor, wherein the controller is programmed to:
      receive the electronic range request signal from the electronic range selector device and a measured auxiliary voltage from the voltage sensor;
      determine a charging state of an alternator;
      determine if the measured auxiliary voltage is less than a calibrated voltage threshold;
      calculate a slope of a decrease in the measured auxiliary voltage; and
      execute a control action when the determined charging state is active and the calculated slope exceeds a calibrated slope threshold, including at least one of requesting a shift of a transmission to a default range and transmitting an indicator signal to an indicator device.

10. The system of claim 9, wherein each push-button of the plurality of push-buttons corresponds to one of a park range, a reverse range, a neutral range, a drive range, and a $1^{st}$ gear/low range.

11. The system of claim 9, wherein the controller is programmed to receive a state of charge of the battery and command the charging state by comparing the received state of charge to a calibrated charging threshold.

12. The system of claim 9, wherein the indicator device includes a display screen, and the indicator signal is a message that is displayed via the display screen.

13. The system of claim 9, wherein the indicator device includes an audio speaker, and the indicator signal is a verbal message that is broadcast via the audio speaker.

14. The system of claim 9, wherein the indicator signal includes a request to display or broadcast, via the indicator device, an amount of time remaining until the measured auxiliary power drops below a critical voltage threshold.

15. The system of claim 9, wherein the controller is programmed to calculate, using the measured auxiliary voltage and the slope, an amount of time remaining until auxiliary power to the controller drops below a critical voltage threshold, and to request a shift of the transmission to a default range when the time remaining drops below a time threshold.

16. A method for predicting a loss of auxiliary power aboard a vehicle and controlling the vehicle in response to the predicted loss of auxiliary power, the method comprising:
   receiving, via a controller, an electronic range request signal from an electronic range selector device;
   measuring an auxiliary voltage of the vehicle via a voltage sensor;
   determining, via the controller, if an alternator of the vehicle is in a charging state and the measured auxiliary voltage is less than a calibrated voltage threshold;
   calculating a slope of a decrease in the measured auxiliary voltage; and
   executing a control action with respect to the vehicle when the alternator is in the charging state and the calculated slope exceeds a calibrated slope threshold.

17. The method of claim 16, wherein executing a control action includes displaying a message via an indicator device in the form of a display screen.

18. The method of claim 16, wherein executing a control action includes broadcasting a verbal message via an indicator device in the form of an audio speaker.

19. The method of claim 16, further comprising:
   calculating, using the measured auxiliary voltage and the calculated slope, an amount of time remaining until the auxiliary voltage below a critical voltage threshold; and
   automatically shifting the transmission to a default range via the controller when the time remaining drops below a time threshold.

20. The method of claim 19, wherein automatically shifting the transmission to a default range includes shifting the transmission to neutral when a speed of the vehicle is above a speed threshold and to park when the speed of the vehicle is below the speed threshold.

* * * * *